(12) United States Patent
Shimotono et al.

(10) Patent No.: US 7,932,882 B2
(45) Date of Patent: Apr. 26, 2011

(54) METHOD AND APPARATUS FOR CHANGING A DISPLAY DIRECTION OF A SCREEN OF A PORTABLE ELECTRONIC DEVICE

(75) Inventors: Susumu Shimotono, Hadano (JP); Satoshi Yamazaki, Sagamihara (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 828 days.

(21) Appl. No.: 11/936,134

(22) Filed: Nov. 7, 2007

(65) Prior Publication Data

US 2008/0129666 A1 Jun. 5, 2008

(30) Foreign Application Priority Data

Dec. 5, 2006 (JP) ................................ 2006-327685

(51) Int. Cl.
*G09G 3/36* (2006.01)
(52) U.S. Cl. ............................ 345/87; 345/649; 361/681
(58) Field of Classification Search .................... 345/87, 345/173, 649, 689; 361/681, 683
See application file for complete search history.

(56) References Cited

U.S. PATENT DOCUMENTS

| 6,396,506 | B1 * | 5/2002 | Hoshino et al. ............... 345/650 |
| 7,310,082 | B2 * | 12/2007 | Choi ............................. 345/156 |
| 2007/0046630 | A1 * | 3/2007 | Hong et al. .................... 345/158 |
| 2008/0036714 | A1 * | 2/2008 | Imai et al. ...................... 345/87 |
| 2009/0091542 | A1 * | 4/2009 | Inaba et al. ................... 345/173 |
| 2009/0201257 | A1 * | 8/2009 | Saitoh et al. .................. 345/173 |
| 2009/0284474 | A1 * | 11/2009 | Komaki et al. ............... 345/173 |

FOREIGN PATENT DOCUMENTS

| CN | 1674600 | 9/2005 |
| JP | 06-259191 | 9/1994 |
| JP | 2000-122635 | 4/2000 |
| JP | 2000-311174 | 11/2000 |
| JP | 2005-092702 | 4/2005 |
| JP | 2006-313313 | 11/2006 |

* cited by examiner

*Primary Examiner* — Kimnhung Nguyen
(74) *Attorney, Agent, or Firm* — Anthony P. Ng; Dillon & Yudell LLP

(57) ABSTRACT

A portable electronic device having a display screen capable of changing display directions is disclosed. The portable electronic device, such as a tablet personal computer, includes a tiltmeter, a display direction determining circuit and a display direction changing circuit. The tiltmeter measures a first tilt angle of a first axis of a display screen of the portable electronic device with respect to a horizontal plane, and measures a second tilt angle of a second axis of the display screen of the portable electronic device with respect to the horizontal plane. The display direction determining circuit determines whether or not a display direction of the display screen is to be changed based on the changing conditions generated by the first tilt angle and the second tilt angle as measured by the tiltmeter. The display direction changing circuit changes the display direction of the display screen from a current display direction to a different display direction according to a determination result formed by the display direction determining circuit.

15 Claims, 8 Drawing Sheets

(A)

(B)

US 7,932,882 B2

METHOD AND APPARATUS FOR CHANGING A DISPLAY DIRECTION OF A SCREEN OF A PORTABLE ELECTRONIC DEVICE

CROSS REFERENCE TO RELATED APPLICATIONS

The present application claims benefit of priority under 35 U.S.C. §§120, 365 to the previously filed Japanese Patent Application No. JP2006-327685 entitled, "Portable electronic device, method of changing display direction of screen, program, and storage medium" with a priority date of Dec. 5, 2006, which is incorporated by reference herein.

BACKGROUND OF THE INVENTION

1. Technical Field

The present invention relates to portable personal computers in general, and more particularly, to a method and apparatus for changing the display direction of a screen of a tablet personal computer.

2. Description of Related Art

In personal computers (PCs), a thin type capable of operating a liquid crystal display (LCD) through input using a pen is called a tablet PC. In a tablet PC, when an operation is performed through input using a pen without utilizing a keyboard, functions equivalent to those of a notebook PC can be realized. When an operation based on input using a pen is carried out, a user often holds a tablet PC by one hand and holds a touch pen in the other hand to direct a touch panel input section on a display screen.

For example, when a user operates a tablet PC through input using a pen while standing, holding the tablet PC along a wide side of a substantially rectangular parallel-piped housing being set as a vertical side may help the user's grasp or viewing in some cases. On the other hand, when the user operates the tablet PC placed on a desk, setting the wide side in a lateral direction may help the user's viewing. Thus, the tablet PC is usually configured to change a display direction of a screen (which will be referred to as a screen direction hereinafter). In the prior art, a rotation button is usually placed at an edge of a display periphery, and a screen direction is rotated every 90 degrees when the user presses the button. As a result, the user can adjust the screen direction accordingly.

The present disclosure provides an improved method for changing the screen direction without the need for a user to press the rotation button.

SUMMARY OF THE INVENTION

In accordance with a preferred embodiment of the present invention, a portable electronic device, such as a tablet personal computer, includes a tiltmeter, a display direction determining circuit and a display direction changing circuit. The tiltmeter measures a first tilt angle of a first axis of a display screen of the portable electronic device with respect to a horizontal plane, and measures a second tilt angle of a second axis of the display screen of the portable electronic device with respect to the horizontal plane. The display direction determining circuit determines whether or not a display direction of the display screen is to be changed based on the changing conditions generated by the first tilt angle and the second tilt angle as measured by the tiltmeter. The display direction changing circuit changes the display direction of the display screen from a current display direction to a different display direction according to a determination result formed by the display direction determining circuit.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
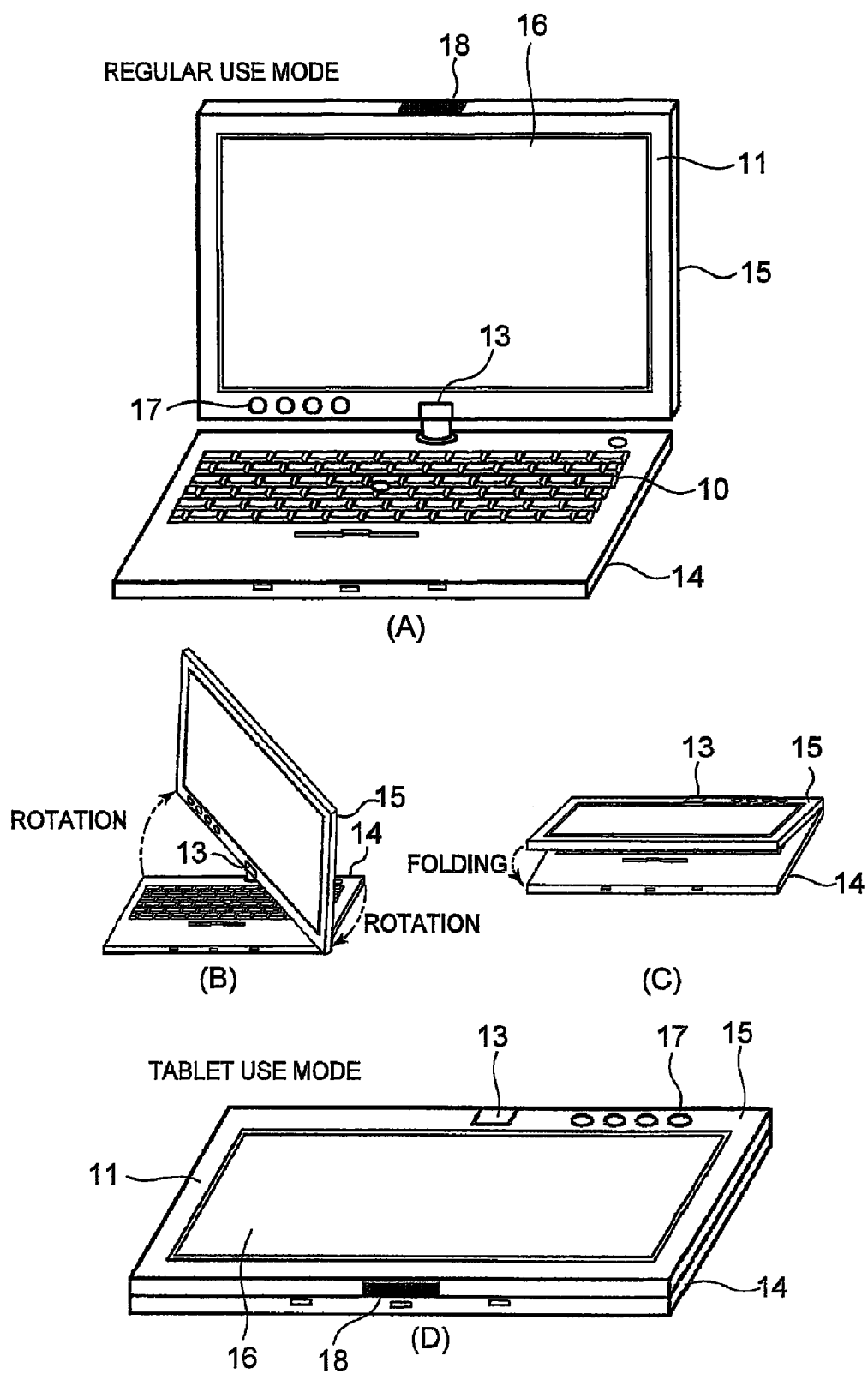
FIGS. 1(A)-1(D) are isomeric views of a tablet personal computer (PC)

With reference now to the drawings, and in particular to FIGS. 1(A)-1(D), there are illustrated isomeric views of a tablet PC 1, in accordance with a preferred embodiment of the present invention. The tablet PC 1 is of a convertible type, and includes a main-body-side housing 14 and a display-side housing 15 both having a substantially rectangular parallel-piped shape. The main-body-side housing 14 includes an input section 10 having a keyboard and a pointing device, and the display-side housing 15 includes a display 11 in which a touch panel input section 16 is superimposed on a liquid crystal to enable input using a touch pen. In addition, the main-body-side housing 14 and the display-side housing 15 are coupled with each other at the center of their ends through a coupling portion 13, and the coupling portion 13 can freely swivel these housings in a direction along which these housings are opened/closed. Furthermore, the display-side housing 15 can be rotated at least 180 degrees in a state where the display-side housing 15 is opened with respect to the main-body-side housing 14. In a PC use mode depicted in FIG. 1(A), the tablet PC 1 can be used as a regular notebook PC by an operation with respect to the input section 10. Moreover, when the coupling section 13 is rotated as shown in FIG. 1(B) and the display-side housing 15 is folded to overlap the main-body-side housing 14 as depicted in FIG. 1(C) so that a display plane of the display 11 faces up, a tablet use mode shown in FIG. 1(D) is realized. In the tablet use mode, the tablet PC 1 can be used by an operation with respect to the touch panel input section 16.

A screen direction rotation button 17 is provided at a peripheral part of the display 11 in the display-side housing 15. A screen displayed in the display 11 is rotated in a predetermined direction every 90 degrees each time a user presses the screen direction rotation button once. With regard to a rotating direction, the screen may be rotatable in set clockwise and counterclockwise directions or any selected direction. Further, an antenna 18 required to be connected with any wireless network, e.g., a wireless LAN is provided at an outer edge of the display-side housing 15.

Figure 2:
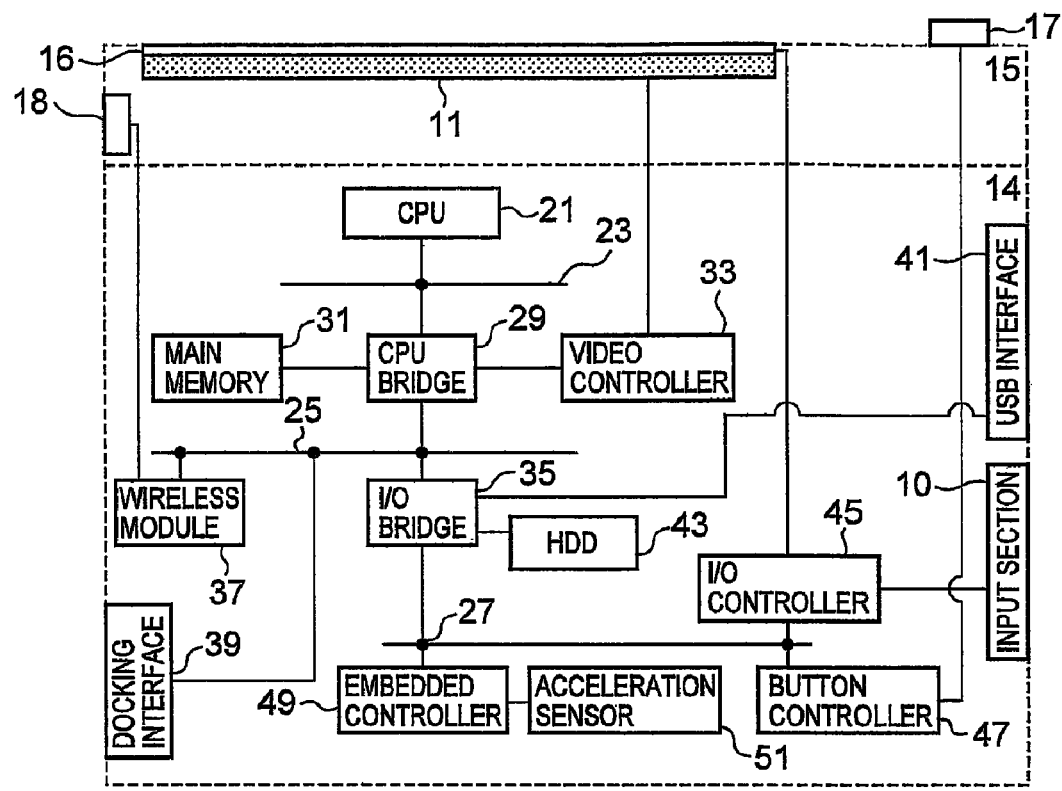
FIG. 2 is a block diagram of a tablet PC, in accordance with a preferred embodiment of the present invention.

FIG. 2 is a block diagram of the main-body-side housing 14 and the display-side housing 15 of the tablet PC 1. A CPU 21 is a central processing unit which is responsible for a central function in the tablet PC, and executes an OS, a BIOS, a device driver, an application program, and others. The CPU 21 is connected with each device through three buses, i.e., an FS bus (a front side bus) 23, a Peripheral Component Interconnect (PCI) bus 25, an Low Pin Count (LPC) bus 27 as an interface which substitutes for an ISA bus, thereby transmitting/receiving signals. The FS bus 23 and the PCI bus 25 are coupled with each other through a CPU bridge 29. The CPU bridge 29 is configured to include a memory controller function which controls an access operation with respect to a main memory 31, a data buffer function which absorbs a difference in data transfer rate between the FS bus 23 and the PCI bus 25.

The main memory 31 is a writable memory which is utilized as a reading region for a program executed by the CPU 21 or a writing operation region in which processing data is written. A video controller 33 has a video chip (not shown) and a VRAM (not shown), generates and writes an image to be drawn in the VRAM upon receiving a drawing command from the CPU 21, and transmits the image read from the VRAM to the display 11 as drawing data. At the same time, the video controller 33 can execute a function of rotating a screen displayed in the display 11 in the counterclockwise direction every 90 degrees in accordance with an operation of the screen direction rotation button 17.

To the PCI bus 25 are connected an I/O bridge 35, a wireless module 37, a docking interface 39, and various kinds of controllers (not shown) required to connect a wired LAN or a PC card. The wireless module 37 performs data communication with a wireless network via the antenna 18. Additionally, the docking interface 39 is used for connection with a docking station. The I/O bridge 35 includes a function as a bridge between the PCI bus 25 and the LPC bus 27. Further, I/O bridge 35 can be connected with an external device (not shown), e.g., an external keyboard, an external mouse, or an external hard disk drive through a USB interface 41. Furthermore, the I/O bridge 35 has a function as an Integrated Device Electronics (IDE) interface and is connected with, e.g., a hard disk drive (HDD) 43. The HDD 43 stores a program required to carry out the present invention in the tablet PC 1. It is to be noted that the program may be stored in a non-volatile memory other than the HDD 43.

To the LPC bus 27 are connected an I/O controller 45, a button controller 47, an embedded controller 49, a power supply device, controllers for these members, a BIOS used to active the system, and others (which are not shown). The I/O controller 45 is connected with the input section 10 used in the PC use mode and the touch panel input section 16 used in the tablet use mode. The button controller 47 detects input from the screen direction rotation button 17. The embedded controller 49 is a microcomputer constituted of, e.g., a CPU, an ROM, an RAM, and others each of which consists of 8 to 16 bits, and includes A/D input terminals and D/A output terminals for a plurality of channels, a timer, and a digital input/output terminal. To the embedded controller 49 are connected a cooling fan (not shown), a temperature sensor (not shown), an acceleration sensor 51, and others via these input/output terminals, and can execute a program of managing an operation environment in the PC independently from the CPU 21. The acceleration sensor 51 measures an acceleration given to the notebook PC 1 from the outside, and outputs an analog voltage associated with this acceleration to the A/D input terminals in the embedded controller 49. The embedded controller 49 A/D-converts the voltage input from the acceleration sensor 51 to obtain an acceleration value. The obtained acceleration value is stored in the embedded controller 49 and read by the CPU 21 via the LPC bus 27 at a predetermined timing.

Figure 3:
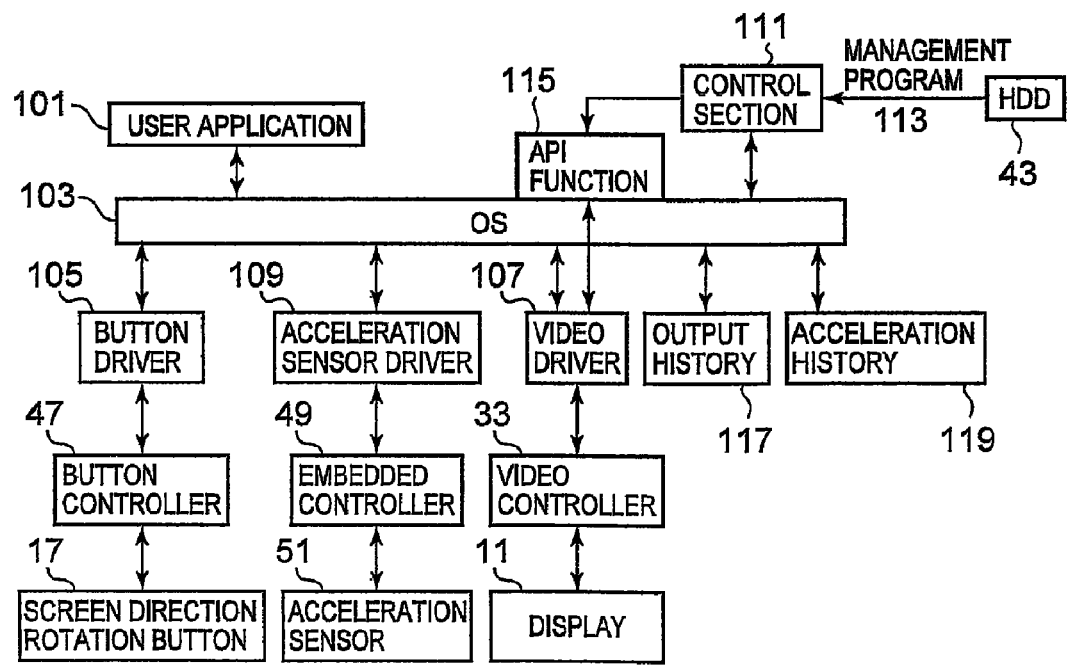
FIG. 3 is a detailed block diagram of software and primary hardware in the tablet PC, in accordance with a preferred embodiment of the present invention.

FIG. 3 is a detailed block diagram of software and primary hardware in the tablet PC 1, in accordance with a preferred embodiment of the present invention. A user application 101, an OS (an operating system) 103, various kinds of device drivers (an operation button driver 105, a video driver 107, an acceleration sensor driver 109, and others), and respective pieces of data (an output history 117, an acceleration history 119, and others) are read into the main memory 31 from the HDD 43, and they are executed or processed in the CPU 21. The user application 101 is various kinds of software operated by a user, e.g., a word processor, a spreadsheet, an electronic mail client, or a web browser. The OS 103 drives the various kinds of hardware through the device drivers and provides various kinds of functions included in the tablet PC 1. The operation button driver 105 cooperates with the button controller 47 to process a signal of an operation button, e.g., the screen direction rotation button 17. The video driver 107 cooperates with the video controller 33 to control the display 11. The acceleration sensor driver 109 periodically inquires at the embedded controller 49 for an acceleration value measured by the acceleration sensor 51, thereby acquiring the acceleration value. A control section 111 is configured when a management program 113 executing the present invention is read into the CPU 21 and the main memory 113, and serves as a central function in the present invention. The management program 113 is stored in the HDD 43, read into the main memory 31 to be executed when the OS starts an operation, and then stays there until the OS terminates the operation. The control section 111 accesses the respective device drivers, data, and the hardware via the OS. The output history 117 stores a history of changes in the screen direction. The acceleration history 119 stores an acceleration value every time the acceleration driver 109 acquires the acceleration value measured by the acceleration sensor 51.

In the present embodiment, the control section 111 constantly grasps the screen direction of the display 11 by acquiring information concerning the screen direction from the video controller 33 via the OS 103 and the video driver 107. When the control section 111 issues a command of changing the screen direction by calling up a specific API function 115 provided to the OS 103, the video controller 33 receives this command via the API function 115 and changes the screen direction of the display 11. Further, when a user presses the screen direction rotation button 17 of the tablet PC 1, the button controller 47 senses this pressing operation and informs the OS 103 and the control section 111 of the pressing operation through the operation button driver 105. The control section 111 which has been informed of the pressing operation of the screen direction rotation button 17 likewise calls up the specific API function 115 provided to the OS 103 and issues a command of changing the screen direction to rotate the screen at a previously set rotation angle (e.g., 90 degrees). The API function 115 transmits the screen direction changing command to the video controller 33 via the video driver 107. Furthermore, when the screen direction is changed, the control section 111 records, e.g., a date, an hour, a changed screen direction, and others in the output history 117.

Figure 4:
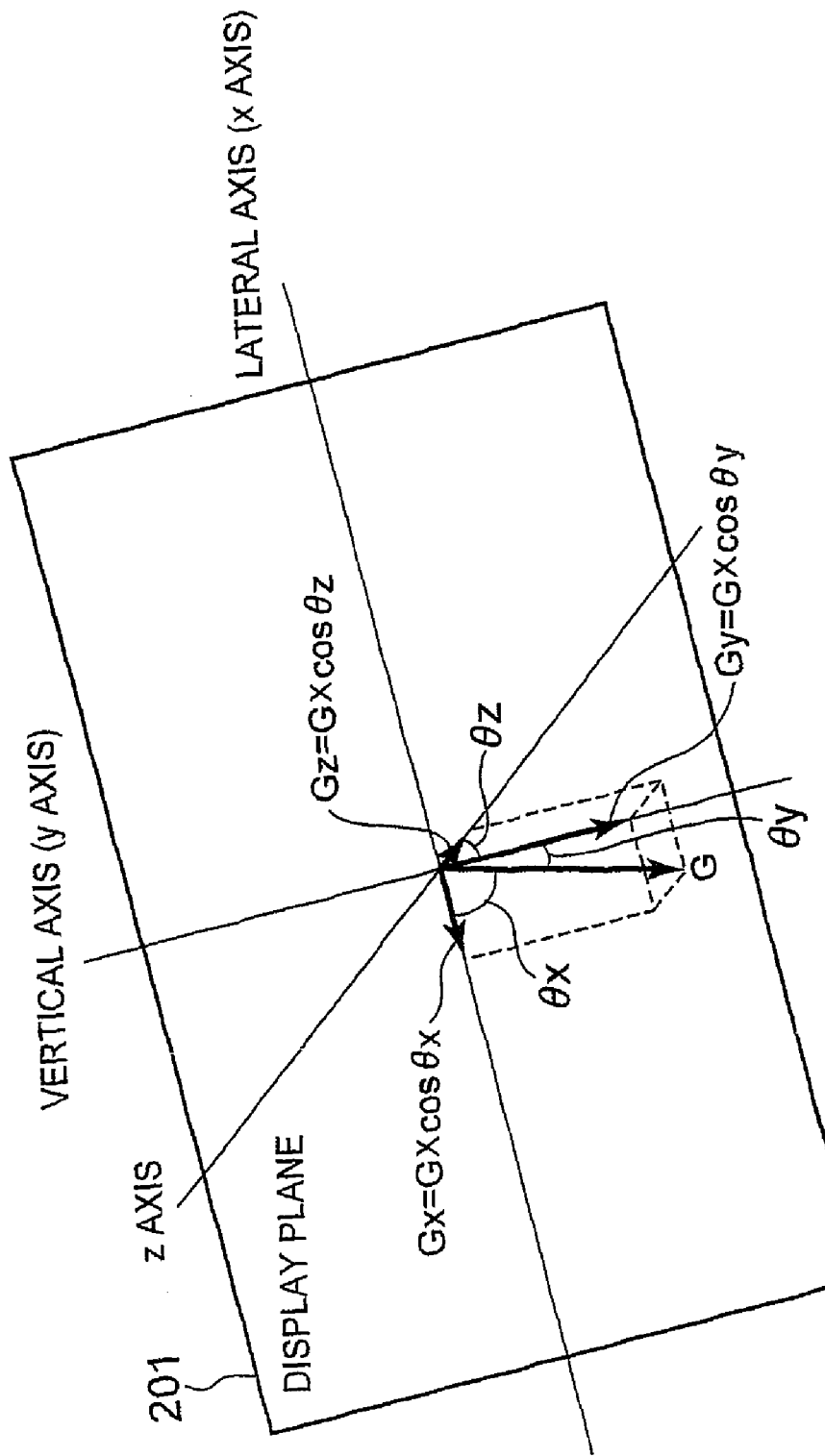
FIG. 4 shows a method of detecting a tilt of a tablet PC by using an acceleration sensor, in accordance with a preferred embodiment of the present invention.

FIG. 4 is an illustration explaining a method of detecting a tilt of a display plane of the tablet PC 1 by using the acceleration sensor 51. A display plane 201 of the display 11 has a substantially rectangular shape, directions of a wide side and a narrow side of the display plane 201 match with directions of a wide side and a narrow side of an upper surface of the display-side housing 15 having a substantially rectangular parallel-piped shape, respectively. Moreover, the screen direction is parallel with the wide side or the narrow side of the display plane 201. As used herein, the screen direction means a direction with respect to a user along which a vertical direction of the screen can be correctly seen, and the vertical direction and the lateral direction orthogonal to the screen can be defined. The acceleration sensor 51 is a bi-axial acceleration sensor module having two sensitivity axes orthogonal to each other. It is assumed that a first sensitivity axis and a second sensitivity axis of the acceleration sensor 51 are matched with the lateral direction and the vertical direction of the screen displayed in the display plane 201.

In FIG. 4, the first sensitivity axis will be referred to as a lateral axis (an x axis) and the second sensitivity axis will be referred to as a vertical axis (a y axis), respectively. The lateral axis is orthogonal to the vertical axis. It is to be noted that, as the acceleration sensor 51, two uniaxial acceleration sensors may be disposed in such a manner that their respective sensitivity axes become orthogonal to each other on a plane parallel to the display plane or two sensitivity axes in an acceleration sensor module having three axes or more may be used in place of adopting the bi-axial acceleration sensor module. Furthermore, the acceleration sensor 51 does not have to be dedicated to the present invention and, for example, an acceleration sensor which is disposed to, e.g., detect drop of the tablet PC 1 may be also used as the acceleration sensor 51.

The acceleration sensor outputs a rate of change (an acceleration) in a speed per unit time as a change in a voltage. Based on this voltage, a target acceleration can be obtained by using a fixed computational expression. As the acceleration sensor, there are several types, e.g., a strain meter type acceleration sensor, a piezo-resistance type acceleration sensor, and a piezoelectric type acceleration sensor depending on the operation principle. An acceleration measured by the acceleration sensor is roughly divided into a static acceleration and a dynamic acceleration. The static acceleration means a gravitational acceleration. All objects receive forces that are proportional to their masses near a geosphere of the earth. This proportionality constant is the gravitational acceleration. On the other hand, the dynamic acceleration means an acceleration which is produced when the sensor is moved. When a voltage output from the acceleration sensor module is divided into a DC component and an AC component, the former component can be detected as the static acceleration and the latter component can be detected as the dynamic acceleration. In the present embodiment, when the lateral axis or the vertical axis is inclined from a horizontal plane, an output voltage from the acceleration sensor 51 is divided into a DC component and an AC component with respect to each of the lateral axis and the vertical axis, thereby obtaining static accelerations of the respective axes from the respective DC components. Furthermore, an angle formed between each of the lateral axis and the vertical axis and the horizontal plane is obtained from the static accelerations based on the following processing.

The gravitational acceleration G constantly faces a direction of the gravitational force, and it can be processed as the same magnitude (i.e., 9.80665 M/s$^2$) on earth. Components of the gravitational acceleration G divided into three axes orthogonal to each other, i.e., the lateral axis (an x axis) and the vertical axis (a y axis) of the display plane 201 and a z axis that is vertical to the display plane 201 orthogonal to both the lateral axis and the vertical axis are determined as $G_x$, $G_y$, and $G_z$, respectively. $G^2 = G_x^2 + G_y^2 + G_z^2$ is achieved. Further, angles formed between the $G_x$ axis and the direction of gravitational force, between the y axis and the direction of gravitational force, and between the z axis and the direction of gravitational force are determined as $\theta_x$, $\theta_y$, and $\theta_z$. $G_x = G \times \cos \theta_x$, $G_y = G \times \cos \theta_y$, and $G_z = G \times \cos \theta_z$ are achieved, respectively. A gravitational force measured as a static acceleration in the lateral axis by the acceleration sensor 51 is $G_x$, and a gravitational force measured as a static acceleration in the vertical axis by the same is $G_y$. Therefore, assuming that $\theta_x = a \cos(G_x/G)$ and $\theta_y = a \cos(G_y/G)$, angles $\theta_x$ and $\theta_y$ formed between the x axis and the direction of gravitational force and between the y axis and the direction of gravitational force can be obtained. It is to be noted that a cos is an inverse of a cosine function. If $\theta_x$ and $\theta_y$ are obtained, angles $\delta_y$ and $\delta_y$ formed between the x axis and the horizontal direction and the y axis and the horizontal direction can be obtained as $\delta_x = 90$ degrees$-\theta_x$ degrees and $\delta_y = 90$ degrees$-\theta_y$ degrees with a unit of angles based on a degree method being represented as "degrees." Considering $\theta_x$ and $\theta_y$ in the range of 0 degree to 180 degrees, $\delta_x$ and $\delta_y$ fall within the range of −90 degrees to +90 degrees. In the present embodiment, the control section 111 reads acceleration values of the two axes measured by the acceleration sensor 51, and angles formed between the lateral axis (the x axis) and the horizontal plane and between the vertical axis (the y axis) and the horizontal plane (which will be referred to as tilt angles with respect to the horizontal direction hereinafter) are obtained.

FIGS. 5(A) to 5(C) are views for explaining an example of an operation of changing the screen direction of the tablet PC 1 which operates in the tablet operation mode. FIG. 5(A) shows a state before changing the screen direction, FIG. 5(B) shows a state when the screen direction is changed, and FIG. 5(C) shows a DC output of an acceleration sensor at this time. The acceleration sensor 51 is mounted in the tablet PC 1 in such a manner that a direction of the wide side of the display plane 201 becomes the first sensitivity axis and a direction of the narrow side of the same becomes the second sensitivity axis. The tablet PC 1 can display the screen in four directions denoted by P, Q, R, and S as the screen directions in FIG. 5(A) by changing the screen direction in units of 90 degrees. However, in the present embodiment, the screen direction can be varied between arbitrary screen directions without being changed to the other screen directions. In the screen directions P and R, the first sensitivity axis in the wide side direction is defined as the lateral axis, and the second sensitivity axis in the narrow side direction is defined as the vertical axis. In the screen directions Q and S, the first sensitivity axis in the wide side direction is defined as the vertical axis, and the second sensitivity axis in the narrow side direction is defined as the lateral axis. Further, a tilt direction between the screen directions P and R or between the screen directions Q and S is determined based on a positive/negative sign of a tilt angle.

In FIG. 5(A), the screen is displayed in the screen direction P, and a user holds and operates the tablet PC 1 in one hand while inclining the tablet PC 1 towards himself/herself. When the user uses the tablet PC 1 while displaying the screen in a given screen direction, a tilt angle 301 of the lateral axis with respect to the horizontal plane is relatively small, but a tilt angle 303 of the vertical axis with respect to the horizontal plane is approximately several-ten degrees. When the screen of the tablet PC 1 is to be shown to another user who is facing the user from the state depicted in FIG. 5(A), the screen direction must be rotated 180 degrees to change the screen direction so that the screen can be displayed in the screen direction R. As shown in FIG. 5(B), the user changes a posture of the tablet PC 1 to incline the vertical axis of the display plane 201 toward a direction opposite to that in the state depicted in FIG. 5(A) so that the user who is placed at the opposite position can easily see the screen. Moreover, the lateral axis in the screen direction R is maintained in a substantially horizontal state. Additionally, when a state where the tilt angle 303 of the vertical axis is equal to or above a predetermined value and the tilt angle 301 of the lateral axis is within a predetermined value continues for a predetermined time or more, changing conditions are achieved, and the control section 111 recognizes that the user intends to change the screen direction. It is to be noted that which one of the screen direction P and the screen direction R the given screen direction is changed to is determined by the control section 111 based on a sign of the tilt angle 303 of the vertical axis.

FIG. 5(C) is a schematic graph of the tilt angles of the vertical axis and the lateral axis with respect to the horizontal plane which are measured by the acceleration sensor 51 at this moment. Since FIG. 5(C) is the schematic graph, small fluctuations in the angles which can be observed in actual measurement values are partially omitted. When the user first relatively largely inclines the vertical axis to the new screen direction R depicted in FIG. 5(B) by changing the posture of the housing from the state shown in FIG. 5(A) to the state depicted in FIG. 5(B) to vary the screen direction, it is detected that the second sensitivity axis is inclined toward a negative direction. When this tilt angle is set to be larger than the tilt angle at the time of actually using the tablet PC 1, the user's intention to change the screen direction can be further assuredly reflected.

At this point, besides the tilt angle of the vertical axis with respect to the horizontal plane, the tilt angle of the lateral axis with respect to the horizontal direction is included in the screen direction changing conditions to further clearly reflect the user's intention to change the screen direction with respect the tablet PC 1. A human ability of maintaining an object in the horizontal state when holding the object is very excellent. The present invention utilizes the fact that the tilt angle of the lateral axis of the tablet PC 1 is maintained in the substantially horizontal state as rotation intention information indicative of the user's intention to rotate the screen, and also utilizes the tilt angle of the vertical axis as rotation direction information indicative of a screen direction with respect to the user.

Assuming that the tilt angle of the vertical axis with respect to the horizontal plane has a positive value in the state depicted in FIG. 5(A), it has a negative value in the state shown in FIG. 5(B). When the conditions of the tilt angle of the vertical axis and the conditions of the tilt angle of the lateral axis are continued for a predetermined time, the control section 111 determines that the user intends to change the screen direction to a direction indicated by the tilt angle of the vertical axis. Specifically, for example, it is determined that the changing conditions are achieved at a time point where a state that an absolute value of the tilt angle 301 of the lateral axis with respect to the horizontal plane is 3 degrees or below and a state that an absolute value of the tilt angle 303 of the vertical axis with respect to the horizontal plane is equal to or above 30 degrees are continued for 0.5 second or more, and the control section issues a command of rotating the screen direction 180 degrees. It is to be noted that the control section determines which one of the screen directions P and R the current screen direction is changed to based on the absolute value of the tilt angle of the vertical axis and a sign of the tilt angle.

Since there is a time zone in which a tilt of the tablet PC is apt to fluctuate immediately after the screen direction is rotated 180 degrees, a period of two seconds as a predetermined time from the change in the screen direction is set as a delay time 307, and the control section 111 does not change the screen direction until this delay time elapses even if new changing conditions are achieved. Even if the vertical axis with respect to another screen direction is inclined after the changing conditions are achieved and the screen direction is changed, the screen direction is not changed unless the conditions of the tilt angle of the vertical axis in this direction, conditions of the tilt angle of the lateral direction in the same, and the changing conditions based on a continuation time are satisfied.

FIGS. 6(A) to 6(C) are views for explaining an operation of changing the screen direction of the tablet PC 1 according to this embodiment to another direction. The definitions of the directions of the first sensitivity axis and the second sensitivity axis with respect to the display plane and the screen directions P, Q, R, and S are the same as those depicted in FIG. 5. FIG. 6(A) shows the same state as that depicted in FIG. 5(A). When the screen of the tablet PC 1 is to be shown to another user who is placed on the right-hand side of the user from the FIG. 6(A) state, the user must change the screen direction to the screen direction Q as depicted in FIG. 6(B). Therefore, the user greatly changes the tilt angle 301 of the first sensitivity axis with respect to the horizontal plane, and substantially horizontally maintains the tilt angle 303 of the second sensitivity axis with respect to the horizontal plane. Additionally, the user maintains the tilt angles 301 and 303 for 0.5 second, thereby producing changing conditions. Since the vertical axis and the lateral axis of the screen are defined in accordance with each screen, the first sensitivity axis recognized as the lateral axis in FIG. 6(A) is recognized as the vertical axis in FIG. 6(B) and the second sensitivity axis recognized as the vertical axis in FIG. 6(A) is recognized as the lateral axis in FIG. 6(B) when the changing conditions are produced.

FIG. 6(C) is a schematic graph of the tilt angles of the vertical axis and the lateral axis with respect to the horizontal plane which are measured by the acceleration sensor 51 at this moment. Since the user changes a posture of the tablet PC 1 from the FIG. 6(A) state to the FIG. 6(B) state, the tilt angle 301 of the first sensitivity axis with respect to the horizontal plane is inclined toward the Q direction at 30 degrees or more and the tilt angle 303 of the second sensitivity axis with respect to the horizontal plane is maintained in the range of ±3 degrees. The control section 111 recognizes the first sensitivity axis as the vertical axis and the second sensitivity axis as the lateral axis. When the conditions of the tilt angle of the vertical axis and the conditions of the tilt angle of the lateral axis with respect to the screen direction in FIG. 6(B) are continued for 0.5 second, the control section 111 determines that the user intends to change the screen direction to the screen direction depicted in FIG. 6(B), thereby rotating the screen 90 degrees. Providing a delay time 327 at a subsequent step is the same as that in FIG. 5.

When the tilt angle of the lateral axis with respect to the horizontal plane used for the changing conditions of the screen direction is selected in the range of ±2 degrees to ±3 degrees, the time during which the conditions of the tilt angles of the lateral axis and the vertical axis are continued is selected in the range of 0.5 second to 1.0 second and the delay time is selected in the range of 2 to 3 seconds, comfortable operability can be obtained while avoiding an operation which is against the user's intention. Likewise, as an absolute value of the tilt angle of the vertical axis with respect to the horizontal plane, the range of 25 degrees to 30 degrees is excellent, but there are individual differences in regard to this numerical value, and hence enabling customization by the user is desirable.

Figure 5:
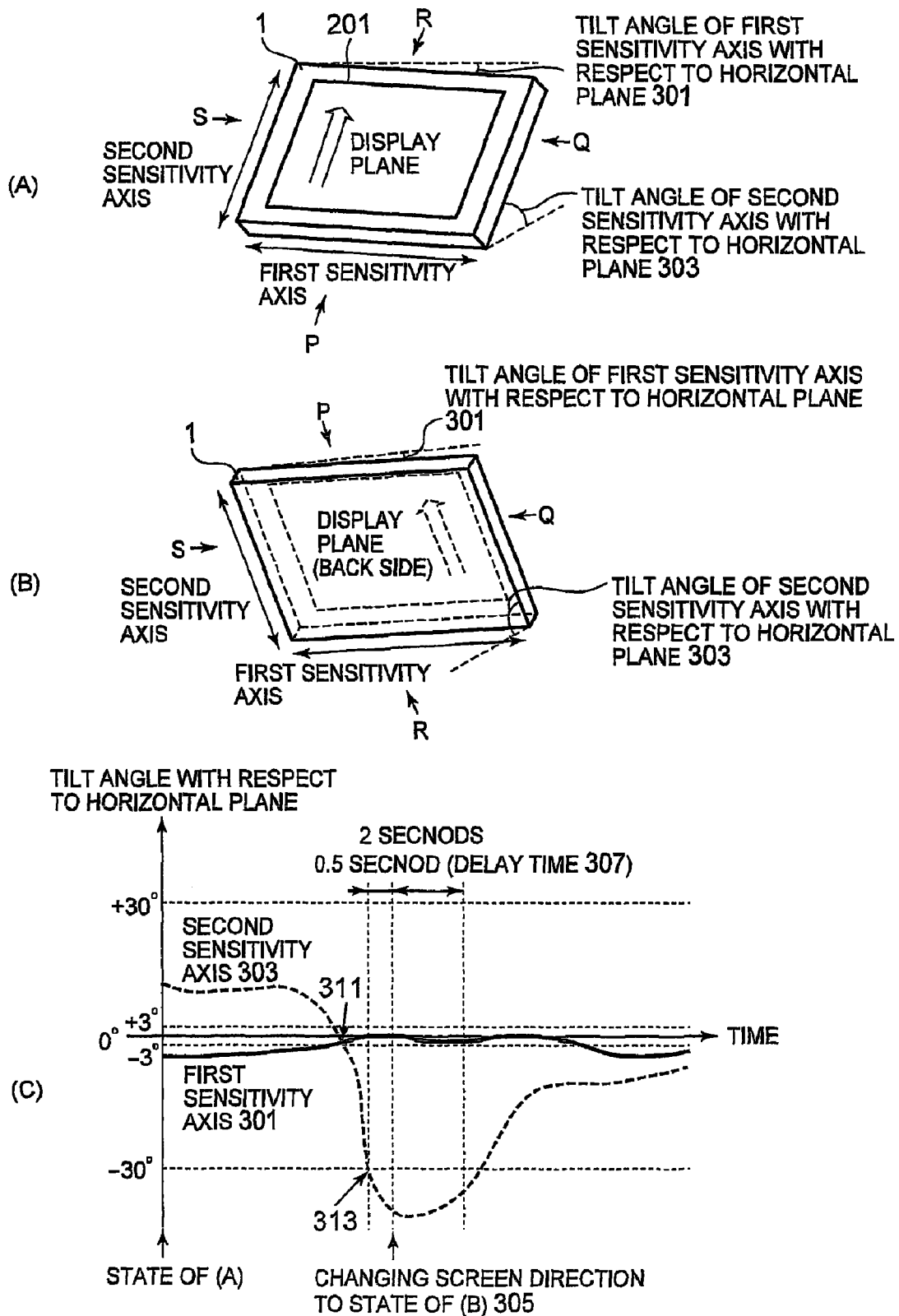
FIGS. 5(A)-5(C) show an operation of changing a screen direction of a tablet PC, in accordance with a preferred embodiment of the present invention.
Figure 6:
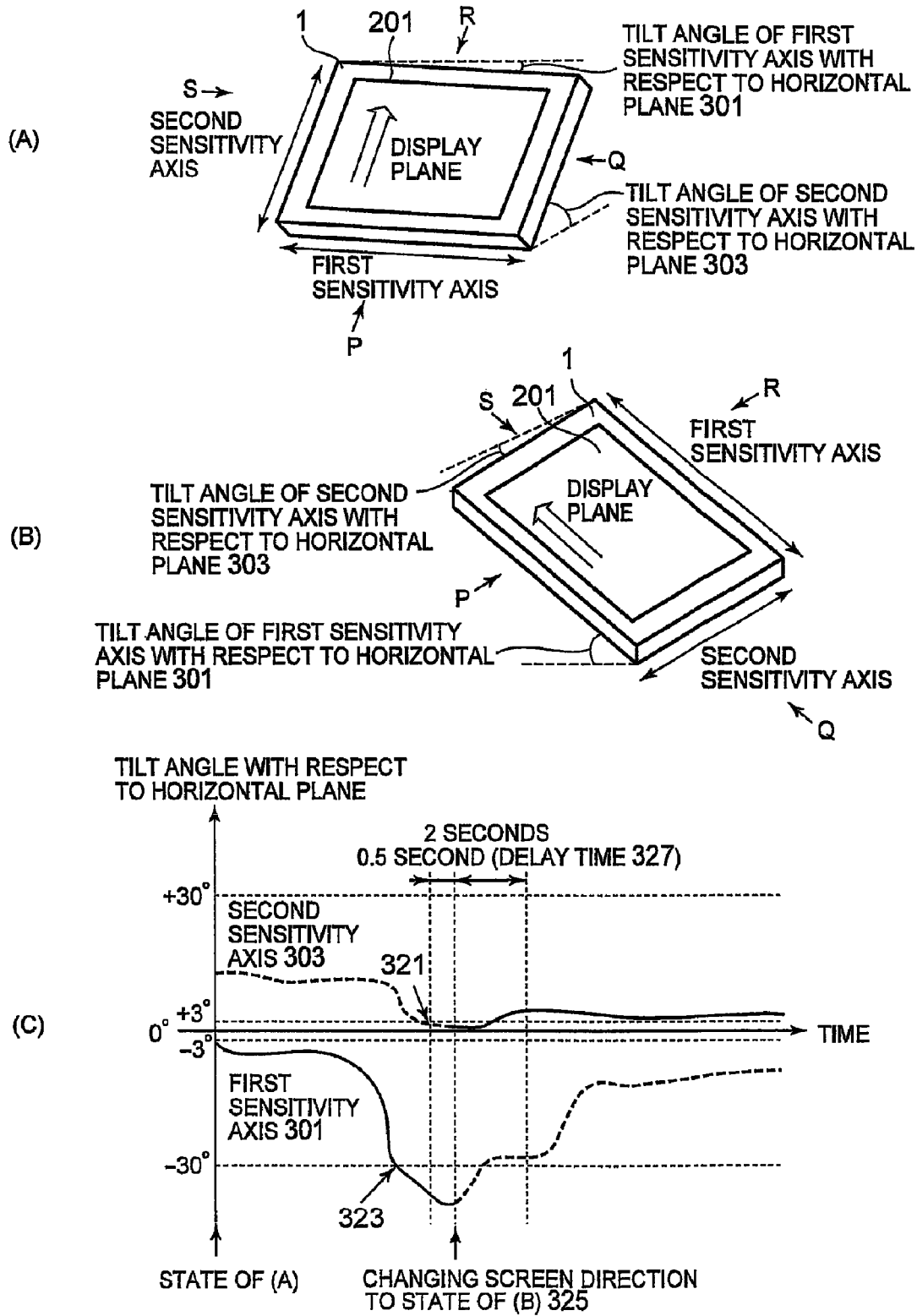
FIGS. 6(A)-6(C) show an operation of changing a screen direction of a tablet PC, in accordance with an alternative embodiment of the present invention.
Figure 7:
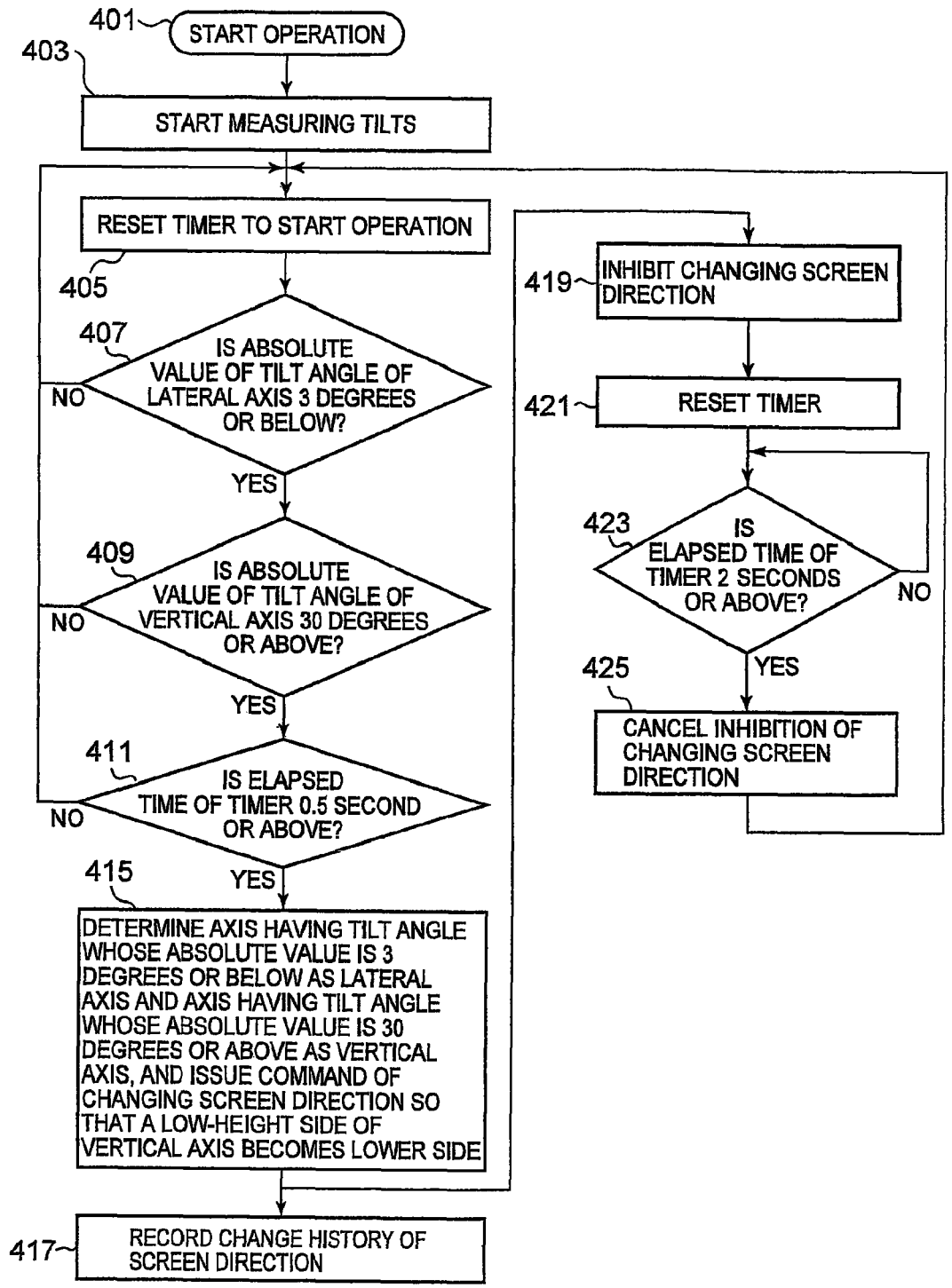
FIG. 7 is a high-level logic flow diagram of a method for changing the screen direction explained in FIGS. 5 and 6.

FIG. 7 is a high-level logic flow diagram showing the operations explained in FIGS. 5 and 6. When an operation of the tablet PC 1 starts (block 401), the control section 111 begins measuring the tilt angles of the first sensitivity axis and the second sensitivity axis with respect to the horizontal plane by using the acceleration sensor 51 (block 403), and further resets a timer to start measuring an elapsed time (block 405). Whether an absolute value of the tilt angle of the lateral axis in a given screen direction is 3 degrees or below is determined (block 407). If the absolute value of the tilt angle of the lateral axis is not 3 degrees or below in any screen direction, the control returns to the block 405 to reset the timer. When the control section 111 determines that the absolute value of the tilt angle of the lateral axis with respect to a specific screen direction is 3 degrees or below in the block 407, whether an absolute value of the tilt angle of the vertical axis with respect to this screen direction is 30 degrees or above is determined (block 409). If the absolute value of the tilt angle of the vertical axis is less than 30 degrees in the block 409, the control returns to the block 405 to reset the timer. When the control section 111 determines that the absolute value of the tilt angle of the vertical axis is 30 degrees or above in the block 409, whether a time measured by the timer is an elapse of 0.5 second or more is determined (block 411). This determination may be made by tracking back an acceleration in the past 0.5 second stored in the acceleration history 119, or may be made simply based on the fact that the tilt angles of the lateral axis and the vertical axis have never deviated from the conditions in the block 407 and the block 409 during the 0.5 second. When it is determined that the 0.5 second or more has not elapsed in the block 411, the control returns to the block 405 to reset the timer. That is, in the blocks 407 to 411, screen direction changing conditions, i.e., whether a state where the absolute value of the tilt angle of the lateral axis is 3 degrees or below and the absolute value of the tilt angle of the vertical axis is 30 degrees or above with respect to the given specific screen direction is continued for 0.5 second or more is determined.

When the control section 111 determines that the above-explained state is continued for 0.5 second or more in the block 411, the axis having the tilt angle whose absolute value is 3 degrees or below is determined as the lateral axis, and the axis having the tilt angle whose absolute value is 30 degrees or more is determined as the vertical axis. Further, the control section 111 issues a command of changing the screen direction in such a manner that a low-height side of the vertical axis becomes a lower side based on a sign of the tilt angle of the vertical axis (block 415). Here, the control section 111 records a change history of the screen direction in the output history 117 (block 417). Subsequently, changing the screen direction is inhibited (block 419), the timer is reset (block 421), and whether a delay time of 2 seconds has elapsed from this change is judged (block 423). If the delay time of 2 seconds has elapsed, inhibition of changing the screen direction is canceled (block 425). In the block 423, the control section 111 may judge whether the delay time of 2 second has elapsed from the last change in the screen direction recorded in the output history 117. Here, the control again returns to the block 405 to reset the timer, and the above-explained processing is repeated.

It is to be noted that the tilts of the lateral axis and the vertical axis may slightly vary and the absolute value of the tilt angle of the lateral axis may become 3 degrees or above and then return to its original value, or the tilt angle of the vertical axis may become 30 degrees or below and then return to its original value when the user is using the tablet PC 1 while holding the housing. However, a change in the screen direction based on a fluctuation in the tilt angles is carried out only when the changing conditions "the state where the absolute value of the tilt angle of the lateral axis is 3 degrees or below and the absolute value of the tilt angle of the vertical axis is 30 degrees or above is continued for 0.5 second or more" are achieved and when inhibition conditions "the delay time of 2 seconds elapses from a previous changing hour" are cancelled. Therefore, no matter how the tilt angles of the lateral axis and the vertical axis vary, the screen direction is not changed until the new changing conditions are achieved and the inhibition conditions are canceled. As explained above, in the screen direction changing method according to the present invention, the screen direction can be rapidly changed only when the user intends, and the screen direction can be prevented from being changed when the user does not intend. Since the screen direction can be changed to a predetermined direction at one time by just varying a posture of the tablet PC 1 without a button operation, the user-friendly function is provided.

Furthermore, in the present embodiment, the screen direction can be changed not only based on a fluctuation in the tilt angles, but it can be also changed by pressing the screen direction rotation button 17. The screen direction changed by using the screen direction rotation button 17 may be different from a screen direction detected based on a fluctuation in the tilt angles in some cases. However, since the screen direction is not changed based on a fluctuation in the tilt angles unless the changing conditions based on the tilt angles of the lateral axis and the vertical axis are not achieved, changing the screen direction based on the screen direction rotation button 17 is performed. The screen direction rotation button 17 corresponds to simultaneously effecting achievement of the changing conditions and cancel of the inhibition conditions.

FIGS. 8(A) and 8(B) are views for explaining a method of changing a screen direction under other changing conditions. However, an appearance of a tablet PC, a configuration of hardware, a configuration of software, and a method of detecting tilt angles are the same as those explained with reference to FIGS. 1 to 4, and definitions of directions of a first sensitivity axis and a second sensitivity axis with respect to a display plane 503 and screen directions P, Q, R, and S are the same as those depicted in FIG. 5. FIG. 8(A) shows a state where a screen is displayed in the screen direction P like FIG. 5(A).

Figure 8:
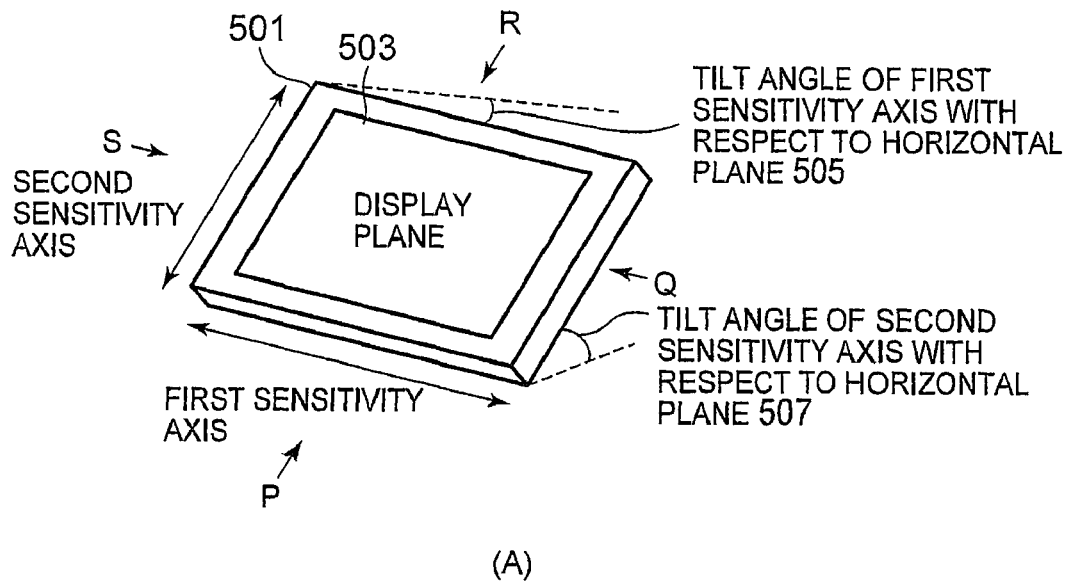
FIGS. 8(A)-8(B) show a method of changing the screen direction under other changing conditions.
Figure 8:
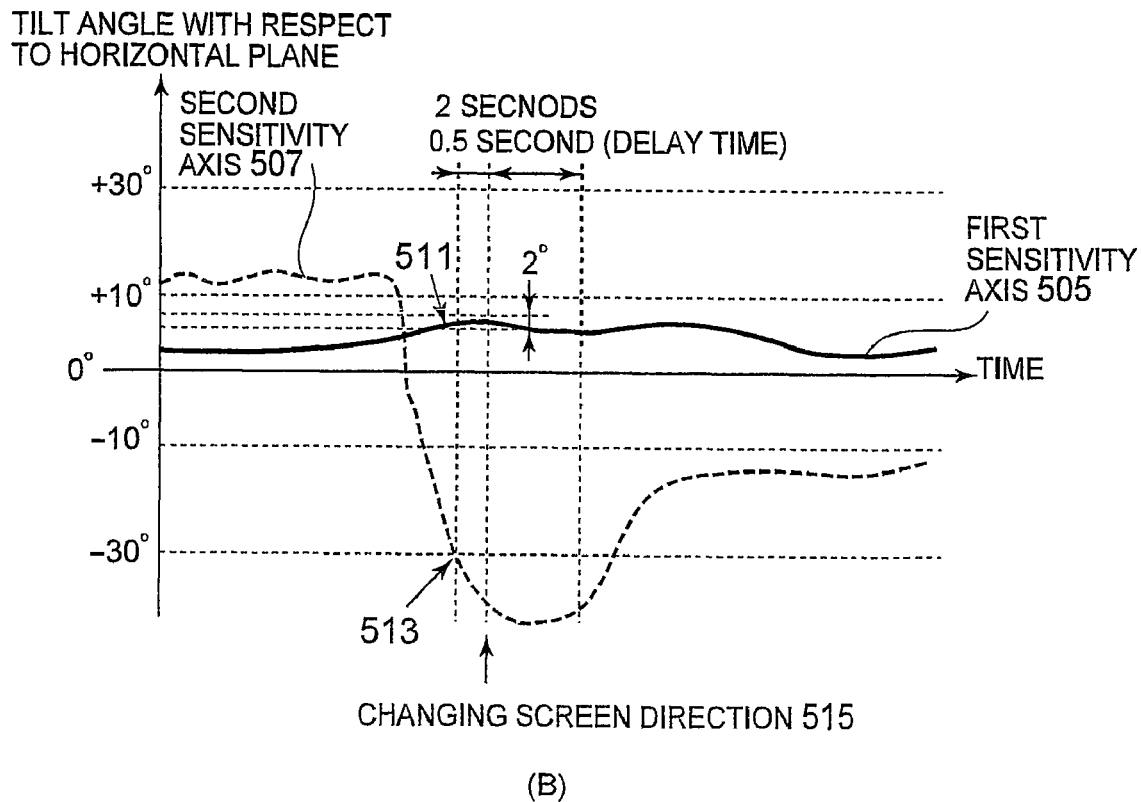

FIG. 8(B) is a schematic graph of tilt angles of a vertical axis and a horizontal axis with respect to a horizontal plane which are measured by the acceleration sensor 51 when substantially the same change in a posture as that depicted in FIG. 5(B) is given to a housing of a tablet PC 501. In the posture shown in FIG. 8(B), although a tilt angle of the lateral axis with respect to the horizontal plane is slightly larger than that in FIG. 5(A) state, a user holds the housing of the tablet PC 1 in such a manner that a fluctuation in the tilt angles is reduced while being maintained in a predetermined range. The tilt angle of the lateral axis in the present example can be utilized as information of the user's intention to rotate the screen, and the tilt angle of the vertical axis can be utilized as information of a direction of rotating the screen by the user. Specifically, for example, it is determined that changing conditions are achieved at a time point 515 where a state in which an absolute value 505 of the tilt angle of the lateral axis with respect to the horizontal plane is 10 degrees or below and a fluctuation in the tilt angle with respect to the horizontal plane in the past 0.5 second as a predetermined time is 2 degrees or below and a state where an absolute value of a tilt angle 507 of the vertical axis with respect to the horizontal plane is 30 degrees or above are continued for 0.5 second or more, and the control section 111 issues a command of rotating the screen direction 180 degrees. This method is the same as the operation depicted in FIG. 5 except conditions of the tilt angle of the vertical axis. Furthermore, an operation of changing the screen direction from a direction depicted in FIG. 6(A) to a direction shown in FIG. 6(B) in the tablet PC 501 is the same as that depicted in FIG. 6 except that conditions concerning a tilt with respect to the horizontal direction are changed like FIG. 8.

Figure 9:
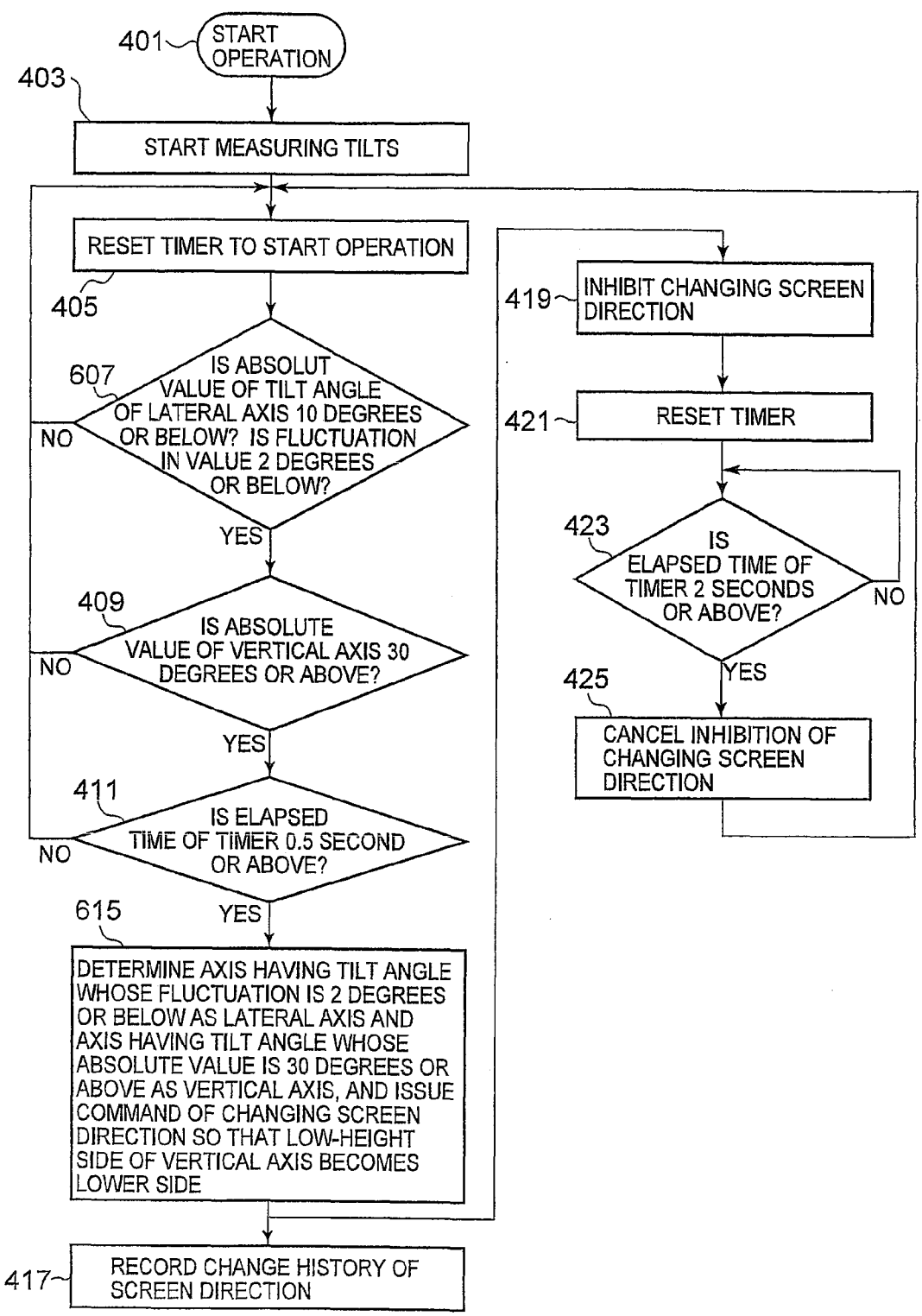
FIG. 9 is a high-level logic flow diagram of a method for changing the screen direction explained in FIG. 8.

FIG. 9 is a high-level logic flow diagram showing the operations explained in FIG. 8. FIG. 8 has two primary differences from FIG. 7. Whether an absolute value of a tilt angle of the lateral axis with respect to a given screen direction is 10 degrees or below and whether a change in the tilt angle of the lateral axis with respect to a given screen direction is two degrees or below in the past 0.5 second are determined (block 607) in place of determining whether the absolute value of the tilt angle of the lateral axis with respect to the given screen direction is 3 degrees or below (block 407 in FIG. 7). At this time, it is assumed that the control section 111 receives a plurality of acceleration values from the acceleration sensor during a period of 0.5 second. The determination in block 607 can be made by extracting a maximum value and a minimum value from the acceleration values in the past 0.5 second stored in the acceleration history 119 and tracing back and obtaining a difference between the maximum value and the minimum value. Moreover, if such conditions are not achieved, the determination conditions in the block 607 may be attained when the absolute value of the tilt angle explained in the block 407 in FIG. 7 is 3 degrees or below. Additionally, in place of determining an axis having a tilt angle whose absolute value is 3 degrees or below as the lateral axis and determining an axis having a tilt angle whose absolute value is 30 degrees or above as the vertical axis in the block 413 in FIG. 7, an axis having a tilt angle whose variation is 2 degree or below is determined as the lateral axis, and an axis having a tilt angle whose absolute value is 30 (or above is determined as the vertical axis (block 615). Since the flow diagram of FIG. 9 is the same as the flow diagram of FIG. 7 except these points, like reference numerals denote processing having like contents, thereby omitting an explanation thereof.

As explained above, the acceleration sensor 51 is a bi-axial acceleration sensor module. In FIG. 4, accelerations $G_x$ and $G_y$ of the display plane 201 with respect to the lateral axis and the vertical axis are measured to obtain the tilt angles of the lateral axis and the vertical axis with respect to the horizontal plane. However, according to this method, each tilt angle can be obtained in the range of 180 degrees alone. That is because $G_x$ and $G_y$ remain unchanged even if an acceleration component $-G_z$ having the same magnitude in an opposite direction substitutes for the component $G_z$ of the gravitational acceleration with respect to the z axis. Considering a specific use status, in a special situation where a lying user operates the tablet PC with the housing facing up and the display plane 201 facing down, the tilt angle with respect to the horizontal direction may exceed the range of −90 degrees to +90 degrees in some cases. However, in such a case, the control section 111 determines that the display plane 201 faces up and determines the accelerations with respect to the lateral axis and the vertical axis. Therefore, the screen direction may be changed to be inverted 180 degrees as seen from the user. To solve this problem, it is good enough to apply a tri-axial acceleration sensor module in place of the bi-axial type and also measure $G_z$ as well as $G_x$ and $G_y$ to determine whether a direction to which the display plane 201 faces is the upper side or the lower side based on a positive/negative sign of a value of measured $G_z$. However, the bi-axial acceleration sensor module is cheaper than the tri-axial type, and a situation where the tilt angle exceeds the range of −90 degrees to +90 degrees does not frequently occur. Therefore, in a general product, the bi-axial acceleration sensor module is applied, and the user uses the screen direction rotation button 17 to change the screen direction in a special use situation where the tilt angle exceeds the range of −90 degrees to +90 degrees. This is less of an obstacle to a practical aspect.

It is to be noted that the tablet PC to which the present invention is applied has been explained as a convertible type in the foregoing embodiment, but the present invention can be likewise applied to a pure tablet type table PC. In the convertible type tablet PC, changing the screen direction based on the accelerations and the screen direction rotation button can be disabled in the regular use mode depicted in FIG. 1(A). Further, the present invention can be applied to a portable electronic device which can be used while rotating the screen, e.g., a PDA, a mobile phone, a game machine, or an electronic data (e.g., an image or a text) display device as well as the tablet PC. Means for detecting a tilt angle is not restricted to the acceleration sensor, and using, e.g., a tilt sensor adopting a potentiometer in which a variable resistor is applied or using a servo type tilt sensor in which a magnetic sensor is applied can be considered. However, since the tilt sensor is built in the portable electronic device, one which has a small size and a light weight and does not degrade portability is desirable. Moreover, although the example where the number of the screen directions is four has been explained in the present embodiment, the number of the screen directions is not restricted to four, and the screen directions can be realized as long as the vertical axis and the lateral axis are defined in each direction. Additionally, the vertical axis and the lateral axis do not necessarily have to be orthogonal to each other.

As has been described, the present invention provides an improved method and apparatus for changing the display direction of a screen of a tablet PC.

Although the aforementioned embodiments describe the hard disk drive, the magnetic recording system according to the present invention is not limited to the hard disk drive, and it can be applied to any other magnetic recording system for recording data in units of tracks on magnetic recording media, such as for a flexible disk, a Compact Disk Recordable (CD-R), and a Digital Versatile Disk Recordable (DVD-R), or a magneto optical disk drive for magneto optical disks.

While the invention has been particularly shown and described with reference to a preferred embodiment, it will be understood by those skilled in the art that various changes in form and detail may be made therein without departing from the spirit and scope of the invention.

What is claimed is:

1. A portable electronic device having a display screen capable of changing display directions, said portable electronic device comprising:

a tiltmeter for measuring a first tilt angle of a first axis of said display screen with respect to a horizontal plane, and for measuring a second tilt angle of a second axis of said display screen with respect to said horizontal plane;

a display direction determining circuit for determining whether a display direction of said display screen is to be changed based on changing conditions generated by said first tilt angle and said second tilt angle, as measured by said tiltmeter; and a display direction changing circuit for changing said display direction of said display screen from a current display direction to a different display direction according to a determination result formed by said display direction determining circuit.

2. The portable electronic device of claim 1, wherein said changing conditions are achieved when conditions of said first tilt angle and conditions of said second tilt angle are simultaneously attained for a predetermined amount of time.

3. The portable electronic device of claim 1, wherein said display direction changing circuit ignores a change in the display direction determined by said display direction determining circuit before a predetermined amount of time has elapsed from a time point at which said current display direction of said display screen is changed.

4. The portable electronic device of claim 1, wherein conditions of said first tilt angle are achieved when an absolute value of said first tilt angle is smaller than a first reference angle.

5. The portable electronic device of claim 1, wherein conditions of said second tilt angle are achieved when an absolute value of said second tilt angle is larger than a second reference angle.

6. The portable electronic device of claim 1, wherein conditions of said first tilt angle are achieved when an absolute value of said first tilt angle is smaller than a third reference angle and a difference between a maximum value and a minimum value extracted from a plurality of first tilt angles detected during a predetermined period is equal to or smaller than a fourth reference angle smaller than said third reference angle.

7. The portable electronic device of claim 1, wherein said portable electronic device is a tablet personal computer.

8. The portable electronic device of claim 1, wherein said tiltmeter includes an acceleration sensor.

9. The portable electronic device of claim 1, wherein said first axis is orthogonal to said second axis.

10. A method of changing a display direction of a display screen on a portable electronic device, said method comprising:

measuring a first tilt angle of a lateral axis with respect to a horizontal plane;

measuring a second tilt angle of a vertical axis with respect to said horizontal plane;

acquiring rotation intention information from said first tilt angle;

acquiring rotation direction information from said second tilt angle; and changing display direction of said display screen from a first display direction to a second display direction in response to rotation execution information produced from said rotation intention information and said rotation direction information.

11. The method of claim 10, wherein said rotation execution information is produced when said rotation intention information and said rotation direction information are simultaneously maintained for a predetermined amount of time.

12. The method of claim 10, wherein said rotation intention information includes tilt angle data indicating that said lateral axis in said second display direction is substantially horizontally maintained and includes tilt angle data indicating that said vertical axis in said second display direction is greatly inclined as compared with that in actual use.

13. A non-transitory computer storage medium having a computer program product for changing a display direction of a display screen on a portable electronic device, said computer storage medium comprising:

computer program code for measuring a first tilt angle of a lateral axis with respect to a horizontal plane;

computer program code for measuring a second tilt angle of a vertical axis with respect to said horizontal plane;

computer program code for acquiring rotation intention information from said first tilt angle;

computer program code for acquiring rotation direction information from said second tilt angle; and computer program code for changing display direction of said display screen from a first display direction to a second display direction in response to rotation execution information produced from said rotation intention information and said rotation direction information.

14. The non-transitory computer storage medium of claim 13, wherein said rotation execution information is produced when said rotation intention information and said rotation direction information are simultaneously maintained for a predetermined amount of time.

15. The non-transitory computer storage medium of claim 13, wherein said rotation intention information includes tilt angle data indicating that said lateral axis in said second display direction is substantially horizontally maintained and includes tilt angle data indicating that said vertical axis in said second display direction is greatly inclined as compared with that in actual use.

* * * * *